United States Patent [19]
Giordano et al.

[11] 3,987,620
[45] Oct. 26, 1976

[54] DEVICE FOR CONTROLLING GAS TURBINE ENGINES

[75] Inventors: Giorgio Giordano; Giorgio Caire, both of Turin, Italy

[73] Assignee: Fiat Termomeccanica e Turbogas S.p.A., Turin, Italy

[22] Filed: June 3, 1975

[21] Appl. No.: 583,484

Related U.S. Application Data

[63] Continuation-in-part of Ser. No. 461,084, April 15, 1974, abandoned.

[30] Foreign Application Priority Data

July 31, 1973  Italy.................................. 69312/73

[52] U.S. Cl. ....................... 60/39.28 T; 235/150.1; 235/151.3
[51] Int. Cl.² ......................................... F02C 9/04
[58] Field of Search ................... 235/150.2, 150.21; 60/39.28 R, 39.28 T

[56] References Cited
UNITED STATES PATENTS

| | | | |
|---|---|---|---|
| 2,971,338 | 2/1961 | Bodemuller | 60/39.28 T |
| 3,520,133 | 7/1970 | Loft et al. | 60/39.28 R |
| 3,639,076 | 2/1972 | Rowen | 60/39.28 T |
| 3,662,545 | 5/1972 | Davis | 60/39.28 T |
| 3,672,163 | 6/1972 | White | 60/39.28 R |
| 3,902,315 | 9/1975 | Martin | 60/39.28 R |

*Primary Examiner*—Eugene G. Botz
*Attorney, Agent, or Firm*—Sughrue, Rothwell, Mion, Zinn & Macpeak

[57] ABSTRACT

The electronic device for controlling gas turbine engines includes a plurality of transducers which will generate electrical signals proportional to speed, temperature and pressure to indicate instantaneous operational conditions of the engine. These signals are processed in an electronic circuit and compared with optimum signals to provide an output signal for controlling a servo valve in the fuel feed circuit for the engine.

3 Claims, 8 Drawing Figures

Fig_1

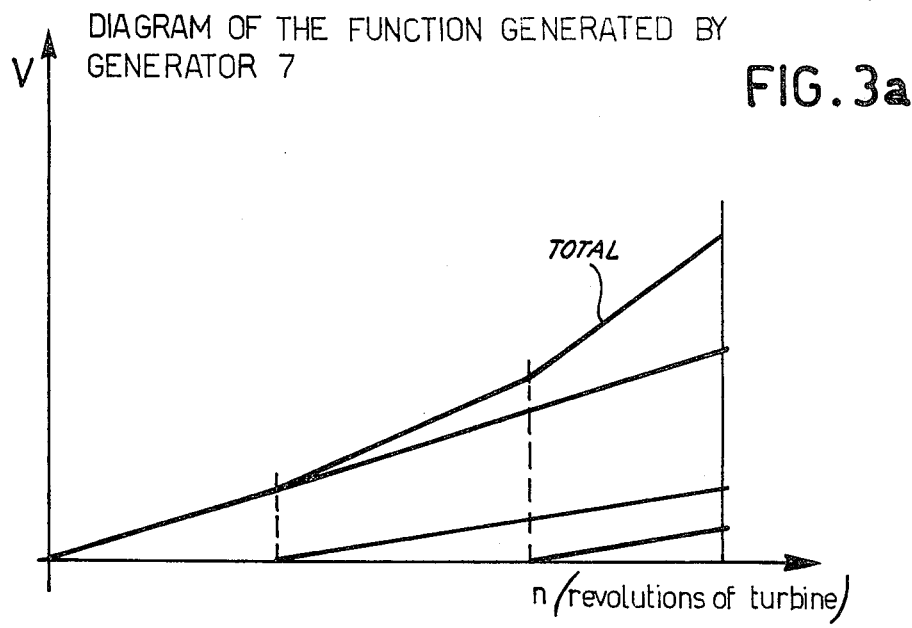
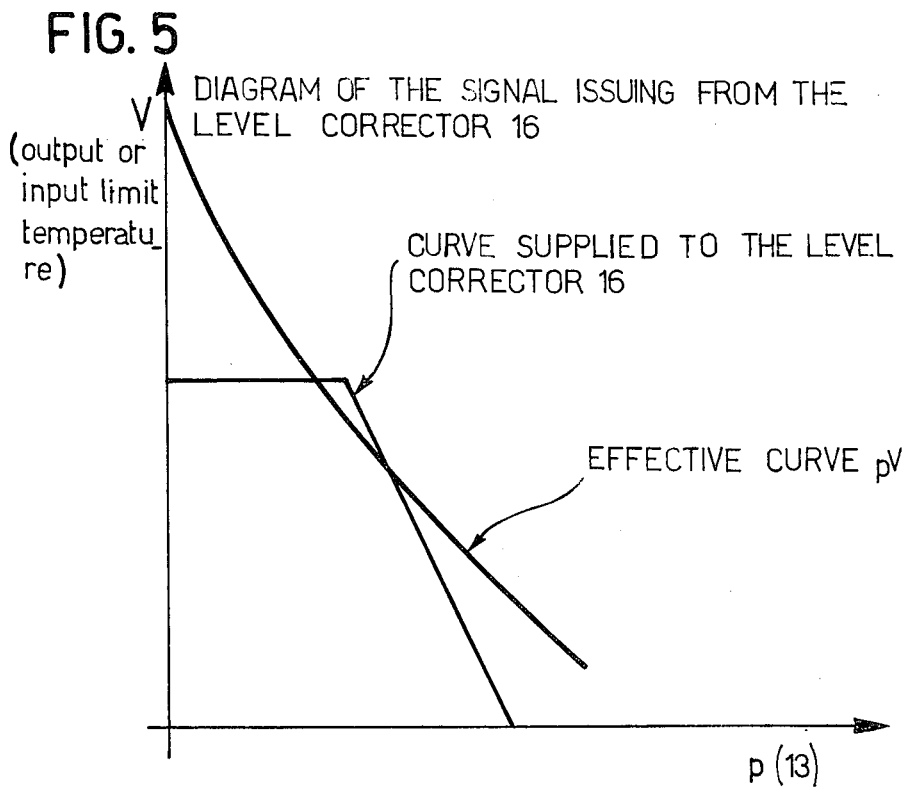

3,987,620

DEVICE FOR CONTROLLING GAS TURBINE ENGINES

This is a continuation-in-part of application Ser. No. 461,084 filed Apr. 15, 1974, and now abandoned. The invention concerns an electronic device for controlling single-shaft single-cycle gas turbine engines. The electronic device controls the speed of the engine by controlling the rate of flow of fuel to the combustion chamber. The object of the invention is to control the speed of a gas turbine engine with a predetermined steadiness within widely adjustable values by limiting acceleration and temperature of the exhaust gases from the gas turbine at every moment in a predetermined manner.

With the above and further objects of the invention in view as will appear from the appended description, the invention provides an electronic device for controlling gas turbine engines comprising transducer means adapted to generate electric signals proportional to parameters, such as speed, temperature and pressure, which are an indication of the instantaneous operational conditions of the engine and an electronic processor driven by the said signals which controls a servo valve interposed in the fuel feed circuit to the combustion chambers.

The invention shall be described with reference to the accompanying drawings given by way of a non-limiting example, wherein:

FIG. 3a is an explanatory diagram illustrating the operation of the circuit according to FIG. 3;

FIG. 5 is an explanatory diagram illustrating the operation of the circuit according to FIG. 4.

Figure 1:
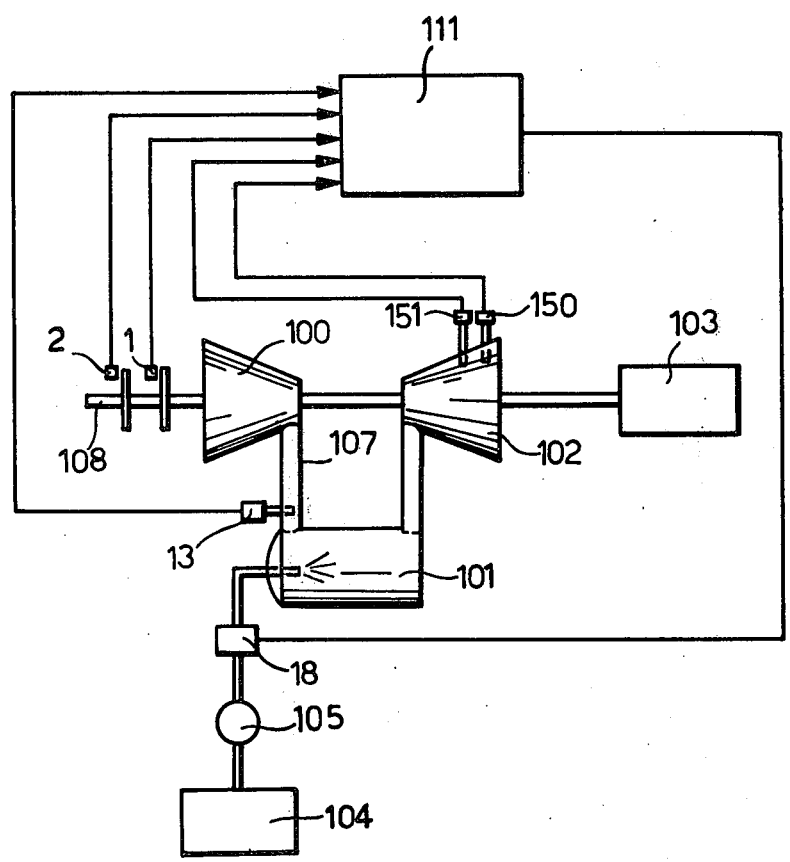
FIG. 1 is a diagrammatical representation of a single shaft gas turbine engine provided with the control device according to this invention.

Referring to FIG. 1, 100 is a compressor of a single-shaft gas turbine, 101 is a combustion chamber, 102 is a turbine, 108 is the turbine shaft transmitting motion to a useful load 103, such as an alternator.

A pump 105 pumps fuel from a reservoir 104, the fuel being admitted through a servo valve 18 to the combustion chamber 101. An electronic device 111 controls the speed of the turbine by processing the signals from:

a transducer 13, responsive to the pressure in the discharge conduit 107 of the compressor 100;

two transducers 150, 151, responsive to the temperature of the gas at the output from the turbine blades and at the exhaust from the turbine respectively;

two tachymetric transducers 1, 2, responsive to the angular speed of the turbine shaft 108.

The electronic device 111 drives the servo valve 118 controlling the fuel quantity fed to the combustion chamber 101.

Figure 2:
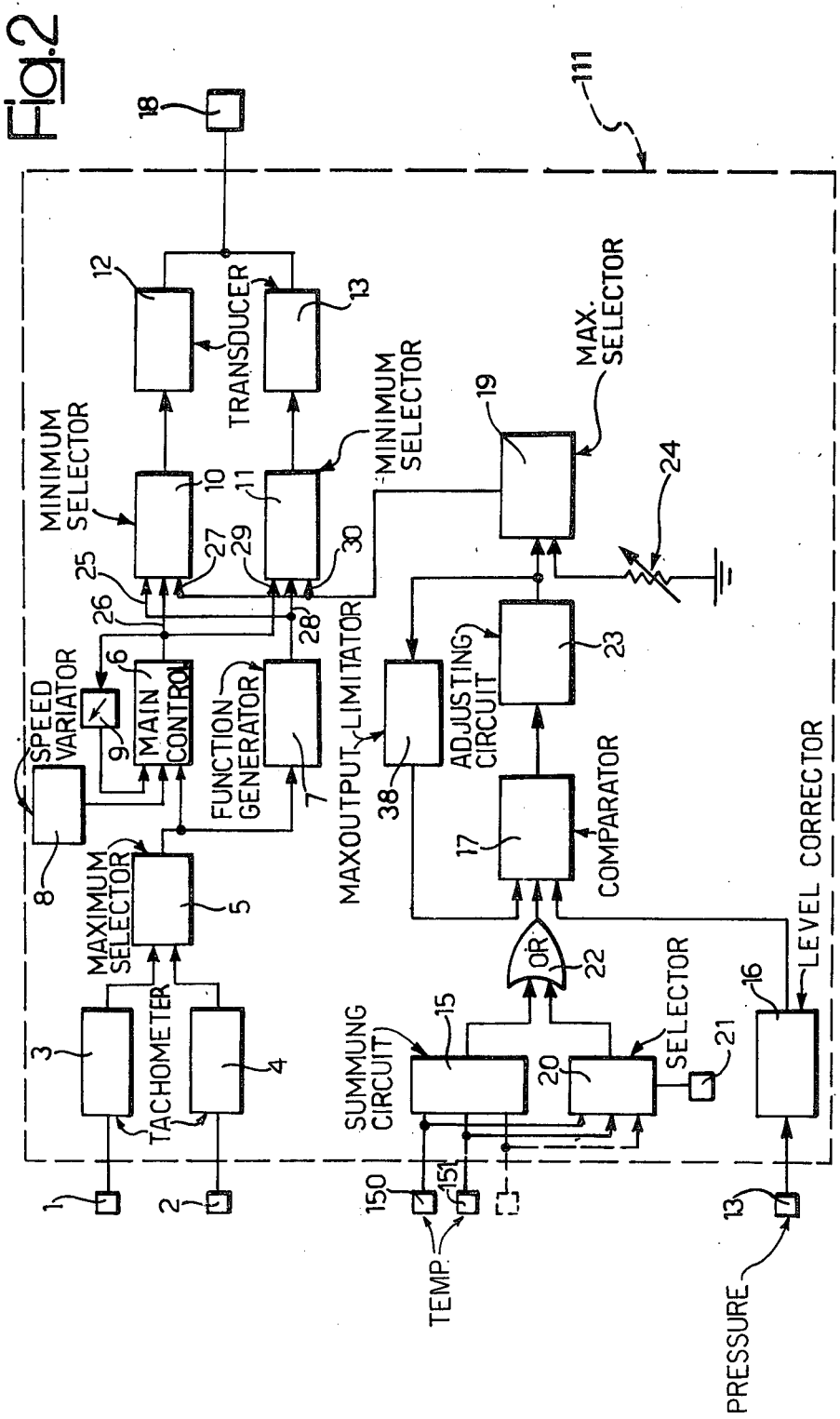
FIG. 2 is a block diagram of the electronic device shown in FIG. 1.

Referring to the block diagram of the electronic device 111, shown in FIG. 2, tachometric circuits 3, 4 receive input signals from two electromagnetic transducers 1, 2, respectively. The circuits 3,4 supply their output voltage to a maximum signal selector 5. The higher voltage issuing from the maximum signal selector 5 is applied to the inputs of a function generator 7 and a main control circuit 6. The main control circuit 6 receives an input voltage supplied by a potentiometric speed variator 8 and is provided with a potentiometric feedback ring 9.

The temperature sensing means 150, 151 simultaneously feed an average value adding circuit 15 and a maximum temperature selector 20 which is abled only on starting of the engine by an outer control 21.

A two-input OR circuit 22 receives the signals from the summing circuit 15 and selector 20 and drives a comparing circuit 17. A further input of the comparing circuit 17 receives the signal issuing from a level corrector 16 driven by the pressure transducer 13.

The comparing circuit 17 drives an adjusting circuit 23. A maximum output limiting circuit 38 is interposed as a feedback between the output from the circuit 23 and the inlet to the comparator 17.

The output of the regulator 23 is connected to one inlet of a maximum signal selector 19 for the temperature signal, the further input to which is connected with a potentiometric voltage divider 24.

Two three-inlet minimum signal selectors 10, 11 operating in parallel each have their own inlets 25, 26, 27 connected with the corresponding inlets to the inputs 28, 29, 30 of the other minimum signal selector.

The output from the circuit 6 is connected to the inputs 26 and 29, respectively, of the minimum signal selectors 10, 11. The output from the function generator 7 is connected with the inputs 25, 28 of the selectors 10, 11, respectively.

The output of the maximum signal selector 19 is connected with the inputs 27, 30 of the selectors 10, 11, respectively.

The output voltages of the two minimum signal selectors 10, 11 are sent to two output control circuits 12, 13 which convert voltage to current adapted to drive the servo valve 18.

Figure 3:
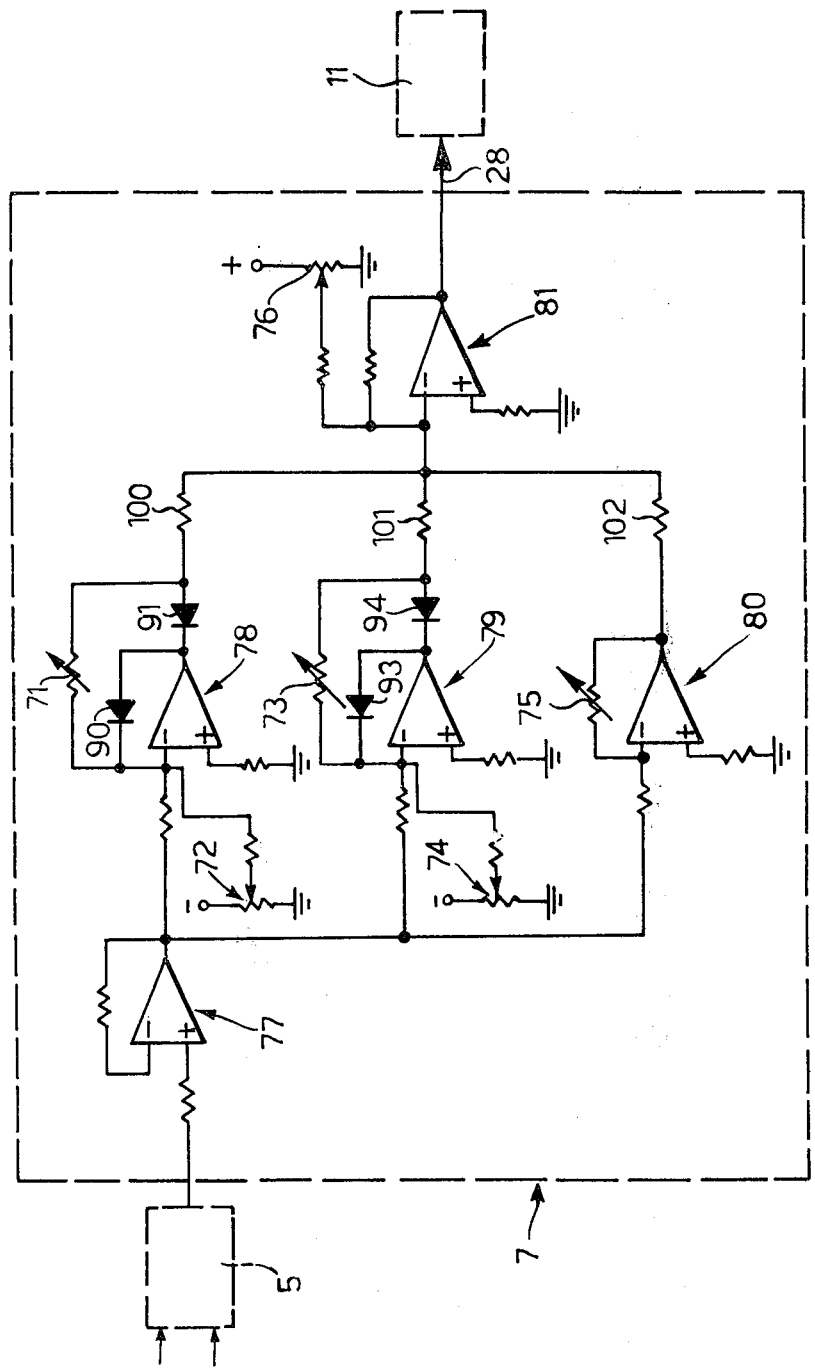
FIG. 3 is a detailed electric diagram of a block in FIG. 2.

FIG. 3 is an electric diagram of the function generator 7 receiving input signals issuing from the maximum signal selector 5 for the tachometric signal, its output being connected with the input 28 to the minimum signal selectors 10 and 11.

Function generator 7 comprises an operational inlet amplifier 77 feeding three operational cells 78, 79, 80 generating non-linear functions. The feedback ring of each cell 78, 79, 80 houses a variable resistor 71, 73, 75. Each reversing input to the cells 78, 79 receives a potentiometric element 72, 74, respectively. The outputs of the three cells are sent to an output operational amplifier 81 to the input of which is moreover connected a third potentiometric element 76, the output being connected with the minimum signal selectors 10 and 11.

The control device operates as follows:

The two transducers 1, 2 supply a signal proportional in frequency to the speed of the turbine shaft 108 to the tachometric circuits 3, 4, these circuits effecting a frequency-voltage conversion. The output voltage is therefore proportional to the speed of the engine. The maximum signal selector selects among the output voltages from the circuits 3, 4 the higher voltage. With this circuitry the operation is ensured even on possible breakdown of either tachymetric channels. The main control circuit 6 compares — by means well known in the art and as such not shown on the drawing — the voltage proportional to the engine speed issuing from the maximum signal selector 5 with a voltage set from the outside by means of the potentiometric speed variator 8 to thereby supply an error signal. Still in the circuit 6 the error signal is processed by a known circuitry of the proportional and integral type; a variable resistor 9 connected as feedback ring varying the feedback of the circuit 6 whereby a steady operation is obtained, which can be adjusted at will from the outside.

The voltage proportional to the engine speed, issuing from the maximum signal selector 5 is sent as an input magnitude to the function generator 7. By operating in combination with the minimum signal selectors 10, 11 the circuit 7 acts to limit on acceleration, that is during starting of the engine, the output from the main regulator 6 when for any reason whatever said output tends to exceed the value of the speed set by means of the speed variator 8. The response curve of the circuit 7 which therefore is a function the value of which at any speed of the engine never exceeds a predetermined threshold, is approximated by a broken line composed of a plurality of segmental sections. The inclination of each of these segments is adjustable by means of the potentiometers 71, 73 and 75 of the operational cells 78, 79 and 80 generating non-linear functions. The positioning of the ends of each section of the broken line is adjustable by means of the potentiometers 72, 74 and 76 of the operation cells 78, 79, 81.

The principle of operation of the block 7 shall now be described in greater detail (FIG. 3). The signal issuing from the maximum signal selector 5 enters the generator 7 through the operational amplifier 77 which couples the generator 7 from the maximum signal selector 5. The signal issuing from the amplifier 77 feeds in parallel the three operational cells 78, 79, 80 operating by virtue of the variable resistors 71, 73, 75 with which they are provided, as variable gain amplifiers. The cells 78 and 79 are provided at their inlet with variable thresholds 72, 74 set at different values and with pairs of rectifying diodes 91, 94 and protective diodes 90, 93, respectively.

As the signal issuing from 77 reaches the input to the cells, the cell 80 gives an output signal proportional to the input but as long as the input signal does not exceed the values set on the thresholds 72 and 74, the cells 78 and 79 give a nil output signal on account of the rectifier diodes 90, 91, 93, 94.

When the input signal exceeds the threshold 72, an output signal is given both by 80 and 78, but when the input signal exceeds the thresholds 74, the absolute value of which is assumed to be higher than the value of 72, the cell 79 also supplies an output signal. These signals are summed by the cell 81 by virtue of the provision of the resistor 100, 101, 102, ultimately resulting in a signal as indicated in the accompanying FIG. 3a which is a function of the number of revolutions consisting of a broken line composed of three sections.

To the three above-mentioned signals there is summed a fixed member determined by the potentiometer 76 which permits by adjustment thereof to effect a vertical translational displacement of the broken line.

The adjustable resistors 71, 73, 75 permit variation of bias of the sections of the broken line.

These types of function generators are dealt with in detail and examples of use are given in the handbook "Amplifier Handbook" R. F. Shea, pages 26–52 to 26–57 McGraw Hill Company, 1966 and in H. D. Huskey and G. A. Korn "Computer Handbook", page 368 McGraw Hill Company New York, 1962.

This type of setting is highly flexible because the characteristic of any of the sections of the broken line can be varied without substantially affecting the remaining sections. It is clear that with the device according to the invention the limitation of acceleration is such as to provide during starting of the turbine a rise in speed, hence in temperature and thermal stresses at the hot parts of the turbine with a graduation according to a predetermined law.

During starting of the turbine the selector circuit 20 selects the higher one out of the two temperature signals from the sensing means 150, 151, consisting of thermocouples; after starting has taken place the adding circuit 15 processes the average value of the temperatures detected by the sensing means 150, 151.

The temperature sensing means 150, 151 measure the temperature on the blades and output gases at the turbine output. Actually, since in operation of the turbine the temperature of burnt gases at the input to the turbine should be limited, this is the temperature to be measured. This measurement is, however, practically impossible, at any rate very inaccurate owing to the high value and non-constant flow of the gases in the combustion chamber.

The object of the invention is to succeed in ascertaining the value of temperature of the turbine input gases by measuring the output temperatures and delivery pressure of the compressor 100.

Considering that the combustion in chamber 101 occurs at constant pressure and expansion takes place according to a known well defined law following a polytropic line, there is obviously a definite relation between the said input temperature and pressure of fluid measured by 13 and temperature of output gases measured by 150 and 151.

Figure 4:
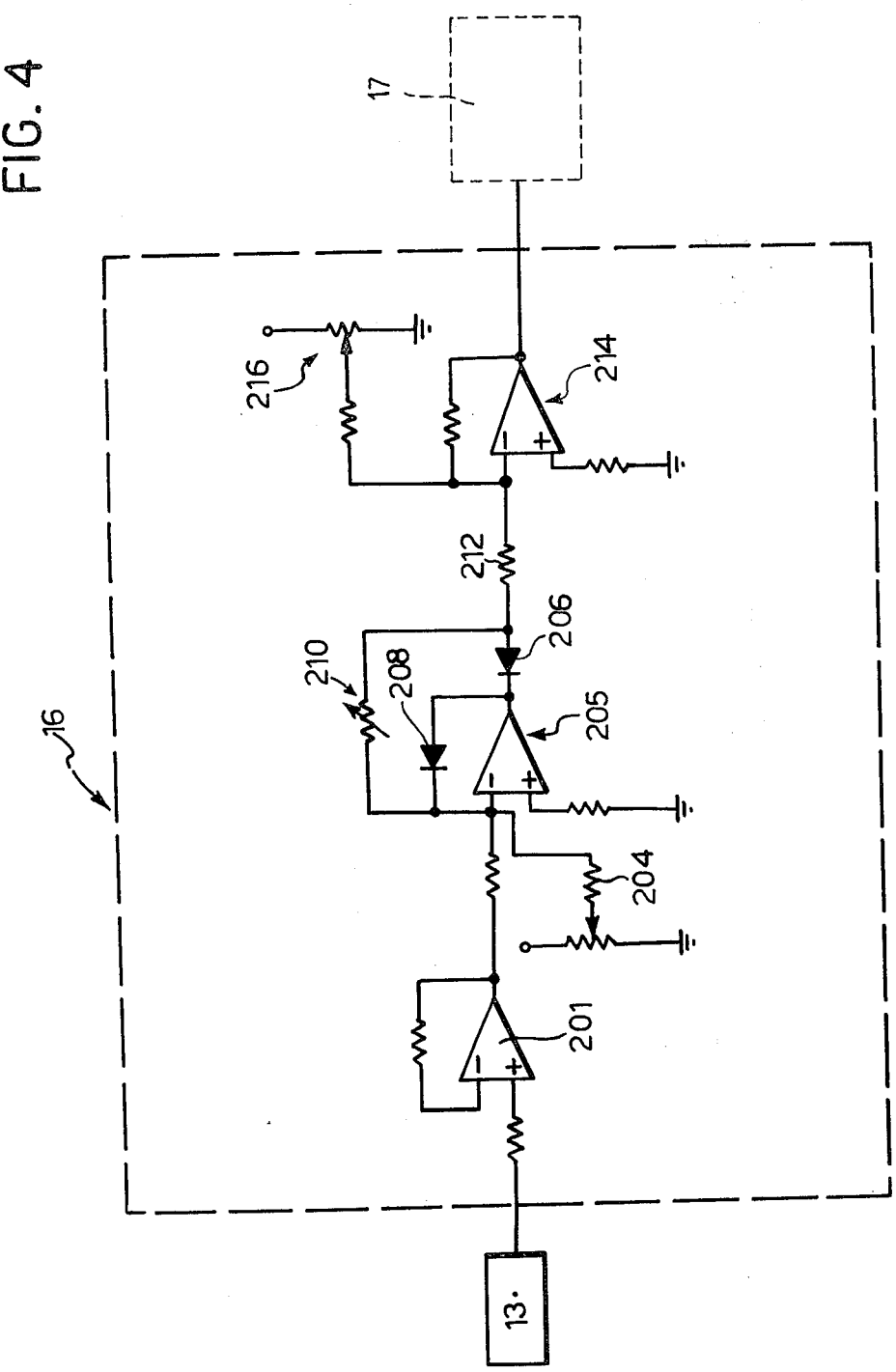
FIG. 4 is a detailed electric diagram of another block in FIG. 2.

The purpose of the level corrector 16 is exactly to supply at the output a signal representing the admissible limit value of the output temperature, corrected on variation in pressure of the fluid entering the combustion chamber. As a matter of fact, in view of the above, about the relation existing between the pressure and temperature, limitation of the input temperatures is obtained by limiting the output temperatures. The structure and principle of operation of the level corrector shall be described with reference to FIG. 4.

The level corrector 16 comprises an input operational amplifier 201 followed by an operational cell 205 with an adjustable input threshold 204, a rectifying diode 206 a protective diode 208 and an adjustable resistor 210. The operational cell 205 is similar to the cells 78, 79 of the function generator 7.

This output signal is summed through a resistor 212 by the amplifier 214 with a signal obtained from the potentiometer 216.

This supplies a signal of the shape shown in FIG. 5, which approaches the imposed limit temperature curve having regard to the temperature-pressure relation of the gas expansion law in the turbine.

This signal is then employed as reference signal for the operation accomplished in the comparator circuit 17.

Depending upon whether the turbine is being started or normally operated, the OR circuit 22 sends the maximum or mdeium temperature signal to the comparator 17.

The temperature signal is compared with a reference signal which is set from the outside and is supplied by the level corrector 16 driven by the transducer 13 responsive to the pressure of the gas discharged from the compressor. The reference signal is therefore made up of a constant term settable from the outside and a correcting term depending upon the pressure of the gas discharged from the compressor.

By comparing as above a temperature signal is indirectly, reproduced which substantially equals the average temperature at the input to the turbine 102.

The error signal issuing from the comparator 17 is sent to the regulator 23 of which the action is proportional and integro-derivative, having a feedback ring 38 such that, if the error is a positive one (temperature signal supplied by sensors 150, 151 lower than the reference signal) its output is maintained at the predetermined upper limit.

Figure 6:
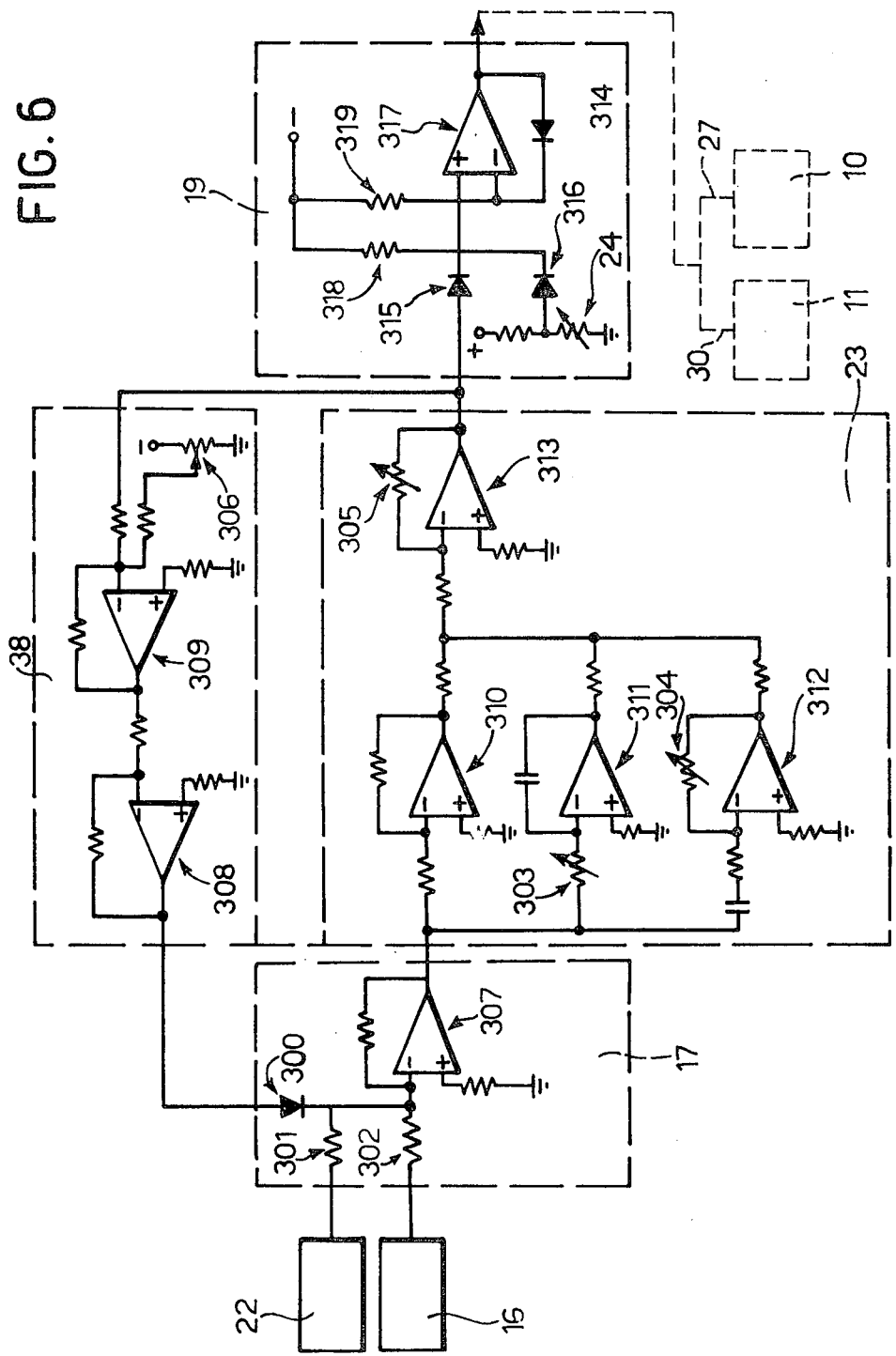
FIGS. 6 and 7 are detailed electric diagrams of further blocks in FIG. 2.

The structure and operational principle of the regulator 23 of which the action is proportional and integro-derivative, having a feedback ring 38 and driven by the comparator 17, shall now be described with reference to FIG. 6. The unit 17 is a comparator fed with a signal issuing from the circuit OR. 22 taking care of the turbine output temperature, and by a signal issuing from the level corrector 16 which represents the reference signal corresponding to the maximum admissible value of the turbine input fluid temperature.

The comparator 307 supplies an output error signal which is the difference between the temperature in the turbine and the reference temperature. This signal enters the controller (adjusting circuit) 23. This controller which is of the proportional-derivative-integrative type comprises three operational cells, namely a proportional cell 310 and integrative cell 311 and a derivative cell the outputs of which are applied to a further operational cell 313 adjustable in gain through the regulator 305.

The output signal 313 is returned by feedback through the circuit 38 to the comparator 17.

The circuit 38 comprises an operational cell 309 which effects comparison of the output from the circuit 23 and a reference voltage settable through the potentiometer 306; the output from 309 is in turn amplified by the cell 308 and applied to the feedback diode 300. Moreover, the output signal 23 is applied to the maximum signal selector 19 which supplies a signal which is greatest between the output of 23 and the signal supplied by the potentiometer 24.

The circuit 19 comprises an input diode 315 through which the signal issuing from 23 comes in, a further input diode 316 fed by a voltage adjustable by means of the potentiometer 24 an amplifier cell 317 provided with a compensating diode 314 and two biasing resistors 318, 319.

The output from the maximum signal selector 19 is sent to minimum signal selectors 10–11 in order to control the input rate of the fuel sent to the turbine as a function of temperature.

The object of the described unit is ultimately to obtain an output comprised between an upper limit given by 306 and a lower limit given by 24, corresponding to maximum and minimum opening power delivered by the turbine.

If the outer temperature signal from 22 is lower than the reference signal from 16, the error issuing from 307 is such as to yield a positive output. On account of the integrative action of 311 this outputs tends to increase up to saturation of the controller; since the reversing input of the comparator 307 is at mass potential, hence the output of 308 is at a voltage of about +0.6V corresponding to the drop on diode 300, owing to the high gain of 308, the output of 309 shall be practically nil.

This means that the difference between the input from 23 and input from 306 is nil, i.e., the output from 23 is caused to match the value imposed by 306.

Since, the value of 306 is greater than the value determined by 24, the output of the maximum signal selector 19 will match the output from 23, namely the above described upper limit.

If the turbine discharge temperature at 22 reaches and tends to exceed the reference value given by 16, the diode is no longer conductive and disables the feedback circuit 38. Since the error from 17 has changed in sign owing to the integrative action, the output from 23 starts decreasing, and so does then also the output from 19.

When the output from 23 becomes lower than 24, the maximum signal selector maintains its output constant equalling the output determined by 24 till an error reversal from 17 takes place, i.e., till the temperature of the turbine sinks below the reference temperature.

When the temperature signal reaches the reference level, the output of the regulator 23 is lowered to the lower limit according to a law depending on the time constants selected for the regulator; if the error again changes in sign the output signal will rise again according to the same law.

The output signal of the regulator 23 in the maximum signal selector 19 is compared with a predetermined external level supplied by the potentiometer 24, the higher level one being selected. This enables to adjust the temperature limit lines for operation under load and on starting, respectively, by varying their inclination and displacing them parallel to themselves.

It is thereby possible to program the temperature control as a function of the type of starting (slow, normal, quick) and suit the temperature limit curve to the peculiar features of the gas turbine engine. The voltage signal proportional to the engine speed from the regulator 6, the voltage signal from the function generator 7 and the voltage signal proportional to the temperature from the maximum signal selector 19 are compared in the minimum signal selector 19 are compared in the minimum signal selectors 10, 11 which select the lower level voltage.

Figure 7:
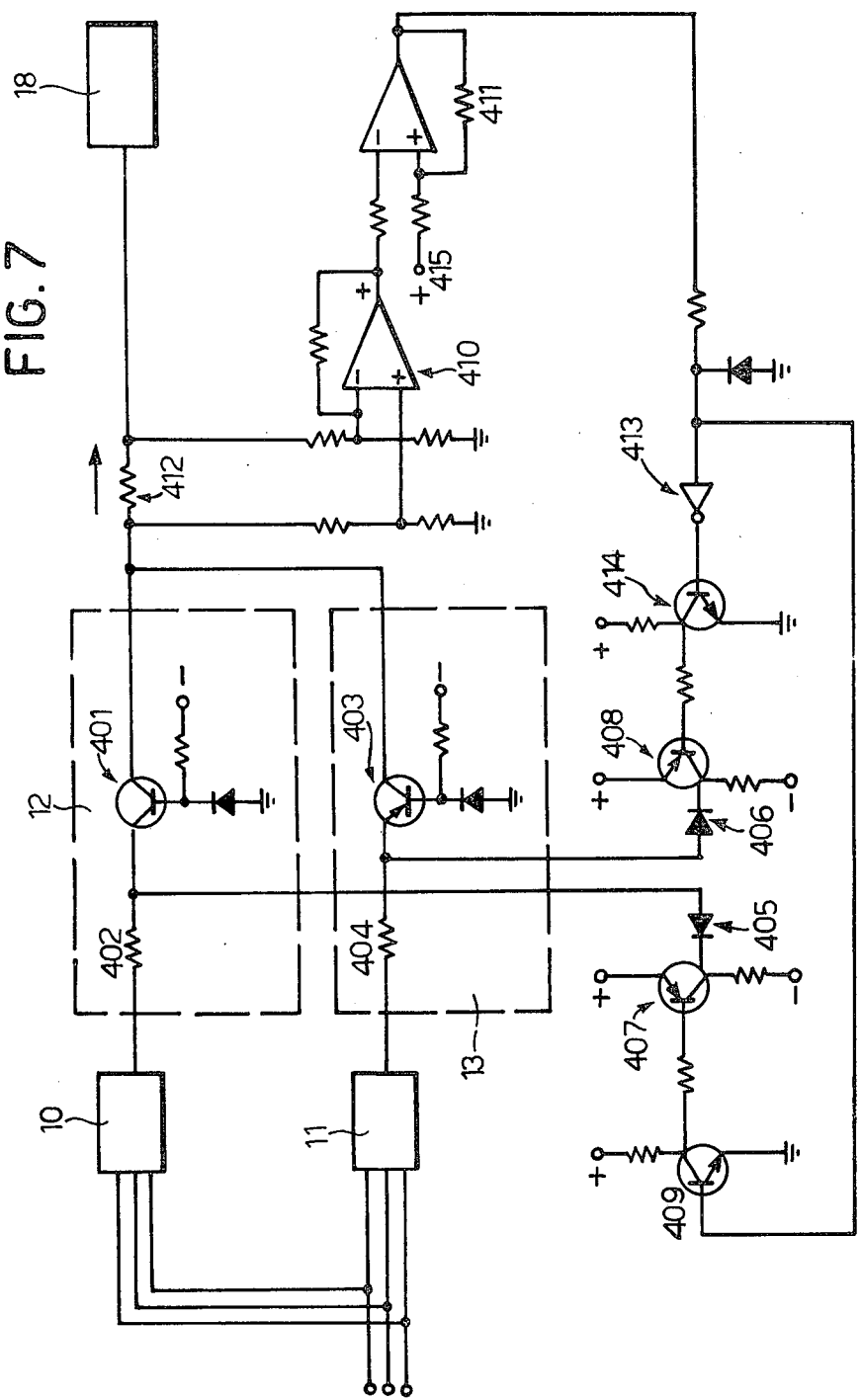

Structure and operational principle of the transducers 12, 13 driven by the minimum signal selectors 10, 11 shall be described in detail also with reference to FIG. 7.

The signal from the minimum signal selector 10 feeds the voltage/current converter 12; the signal from the minimum signal selector 11 which enters a further voltage/current converter 13 behaves in the same manner.

The transistor 401 is so biased that the current issuing therefrom is established by the ratio between the voltage from 10 and resistor 402 (similarly with 13). Actually the current flowing through 402 can be derived from the diode 405 depending upon whether the transistor 407 is conductive or not. The current signal to the valve 18 is converted to a voltage by the resistor 412 and amplified by the operational cell 410; the output from 410 is compared with a fixed reference given by the comparator trigger 411 which determines through the transistors 409 and 414 and inverter 410 the state of conduction of either 407 or 408.

If the comparator 411 makes 409 conductive and blocks 414, 407 leads current and 405 is blocked, 408 shall be blocked, hence conductive diode 406 will drain the whole current from 404.

If the current supplied by 12 converted to voltage by 412 and amplified by 410 exceeds the maximum value predetermined by 415, the comparator 411 reverses its output thereby blocking the diode 406 and making 405 conductive so that the current from 402 is drained by 405 and the valve 18 receives only the current supplied by 13.

With this protection the necessary current can be supplied to valve 18 even where the converter 12 should deliver an excessive current value.

This relatively lower level voltage (selected by maximum signal selectors 10, 11) determines through the output control circuits 12, 13 (voltage-current converters) the more or less wide opening of the servo valve 18, thereby controlling the rate of flow of fuel to the combustion chamber 101 of the engine. The two sets comprising the minimum selector 10 and output control 12 therefor, and the minimum selector 11 and output control 13 therefor, respectively, are identical and operate in parallel, one only out of the two sets being operative under normal conditions. Should the operative set fail and supply an output voltage exceeding the maximum required voltage, it is automatically cut off, the other set coming into action.

What is claimed is:

1. Electronic device for controlling gas turbine engines of the type comprising transducer means adapted to generate electrical signals proportional to parameters, such as engine speed, temperature and pressure, indicating the instantaneous operational conditions of the engine and a processor driven by the said signals, which controls a servo valve interposed in the fuel feed line to the combustion chamber, comprising:

electromagnetic transducer means adapted to detect the engine speed;

tachymetric circuit means driven by said transducer means and adapted to supply an output signal proportional to the engine speed;

a main control circuit which compares the signal proportional to the engine speed with a reference signal set through a speed variator, said circuit being provided with a feedback ring operable from the outside and supplying a signal which controls the servo valve in the fuel feed line to the combustion chamber;

a function generator circuit adapted to limit the energizing level of the servo valve whenever the signal from the main control circuit tends to rise above the limits set by the speed variator;

sensing means adapted to supply a signal proportional to the gas temperature of the output from the turbine blades and at the exhaust from the turbine;

a maximum temperature value selector circuit adapted to supply an output signal proportional to the highest temperature detected by the sensing means in a given time interval;

an average value adding circuit supplying an output signal proportional to the average value of the temperature detected by the sensing means;

a transducer adapted to supply a signal proportional to the pressure of the gas discharged from the compressor;

a level correcting circuit driven by said transducer and adapted to generate a reference signal consisting of a constant term and a correcting term, substantially proportional to the pressure at the output from the compressor;

a comparing circuit adapted to compare the temperature signal issuing from an OR circuit driven by the average adding circuit and by the maximum temperature selector, with the reference signal supplied by said level correcting circuit;

an adjusting circuit and a maximum output limiting circuit driven by the signal issuing from said comparing circuit, adapted to supply a predetermined upper limit output signal when the signal proportional to the temperature is lower than the reference signal generated by said level correcting circuit, the said adjusting and limiting circuits being moreover adapted when the signal proportional to the temperature equals the reference signal to supply a predetermined lower limit output signal;

maximum value selector means for the temperature signal adapted to select the highest level signal among the signals issuing from the adjusting circuit and an outer predetermined level supplied by a potentiometer;

minimum value selector means adapted to select among the signals issuing from the main control circuit, function generator circuit and maximum temperature value selector circuit, the lowest level signal and adapted to supply a voltage proportional to the latter;

voltage-current converting means driven by said minimum value selector means adapted to electrically drive the servo valve.

2. Device as claimed in claim 1, comprising two tachymetric circuits, operating in parallel, and a maximum signal selector circuit adapted to select among the signals from the said tachymetric circuits the higher level signal and send the latter to the main control circuit.

3. Device as claimed in claim 1, wherein the comparing circuit for the temperature signal, the adjusting circuit driven by the said comparing circuit and the maximum output limiting circuit connected with the former form a proportional action feedback control circuit performing a substantially integro-derivative transfer function, the maximum output limiting circuit being connected as feedback component in said control circuit.

* * * * *